United States Patent [19]

Goodrich

[11] 4,148,162

[45] Apr. 10, 1979

[54] MOBILE HOME BLOCK AND TIE-DOWN

[76] Inventor: Donald E. Goodrich, 703 Johnson Dr., Kerrville, Tex. 78028

[21] Appl. No.: 908,257

[22] Filed: May 22, 1978

[51] Int. Cl.² ............................................. E04B 7/00
[52] U.S. Cl. .............................. 52/23; 52/DIG. 11; 52/155; 280/764
[58] Field of Search .................. 52/23, DIG. 11, 155, 52/156, 158; 280/763, 764, 766; 248/354 R

[56] References Cited

U.S. PATENT DOCUMENTS

| | | | |
|---|---|---|---|
| 3,096,065 | 7/1963 | Horne | 280/763 |
| 3,475,008 | 10/1969 | Taylor | 280/763 |
| 3,750,349 | 8/1973 | Deike | 52/DIG. 11 |
| 3,830,024 | 8/1974 | Warnke | 52/23 |
| 3,844,582 | 10/1974 | Cook | 280/764 |
| 3,845,597 | 11/1974 | Foster | 52/DIG. 11 |
| 3,937,436 | 2/1976 | Stewart | 52/155 |
| 4,014,517 | 3/1977 | Keagle | 52/23 |

Primary Examiner—James L. Ridgill
Attorney, Agent, or Firm—Wendell Coffee

[57] ABSTRACT

An arm is pivoted to the main longitudinal beams of a mobile home. A base plate on the end of the arm is held firmly against the ground by stake pins driven through holes in the plate. The tie-down strap extending over the mobile home is attached to a clip on the base plate. A gear and worm mechanical arrangement is used to maintain torque on the arm at the beam. When the mobile home is moved, the arm is conveniently raised against the bottom of the floorboards of the mobile home.

8 Claims, 7 Drawing Figures

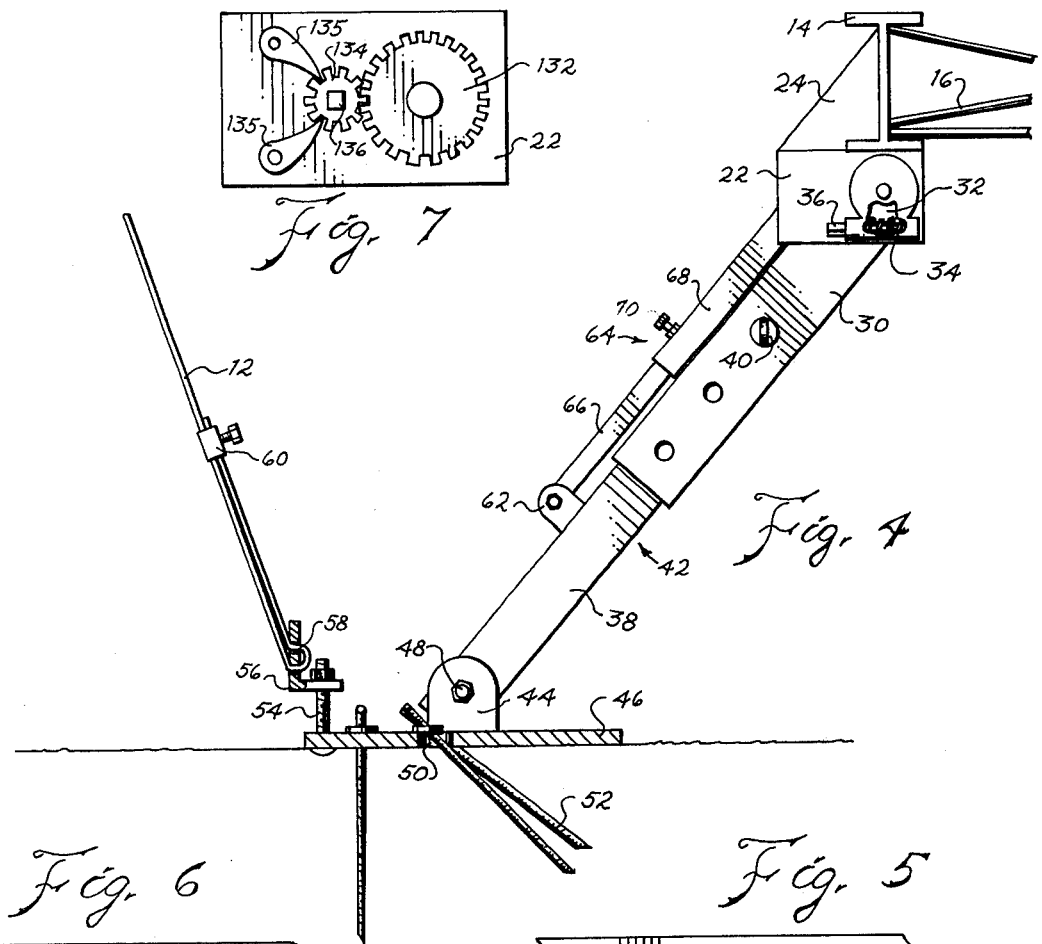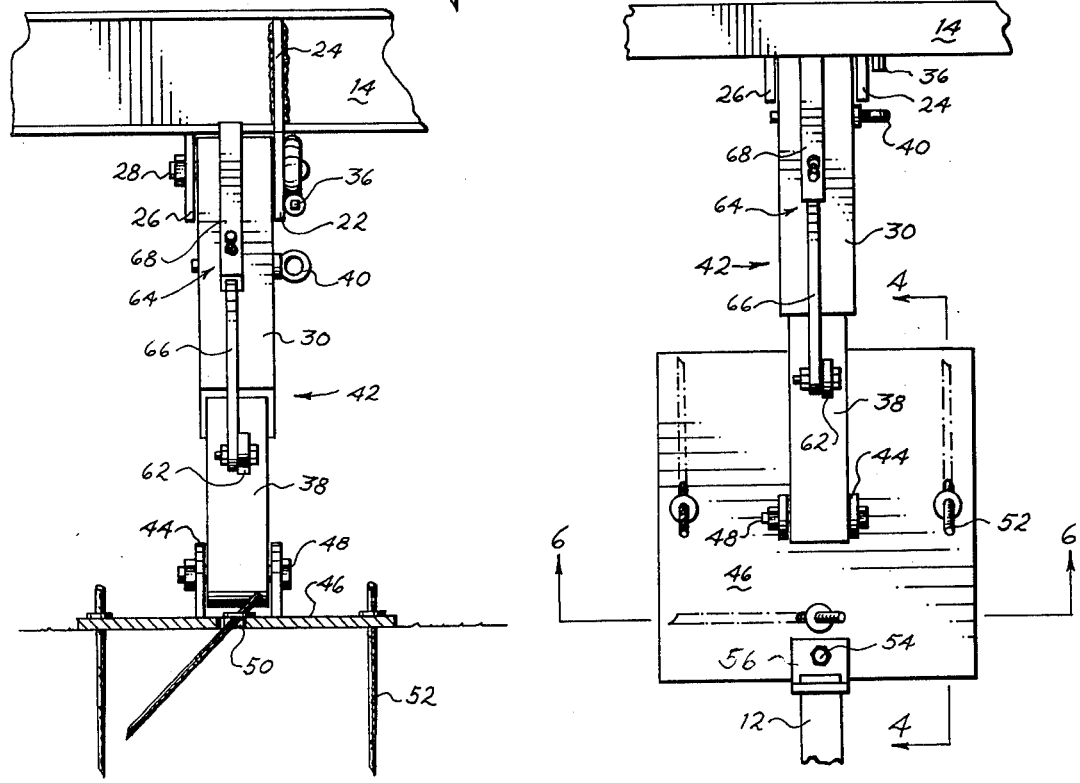

MOBILE HOME BLOCK AND TIE-DOWN

BACKGROUND OF THE INVENTION (1) Field of the Invention

This invention relates to mobile homes and more particularly to supporting and stabilizing the mobile home when parked as well as tying down the mobile home when parked.

(2) Description of the Prior Art

As used herein, the term mobile home is used to include all vehicles which are meant to house people, either as homes or as offices, or all types of living accomodations which are mounted within land vehicles. It is meant to include those which are themselves motorized or which are meant to be trailed or attached to a towing vehicle.

There is often times a problem with the tying down and supporting of trailers. This problem is especially prevalent in offices for construction contractors or homes which, while being mobile, are placed in one location for a considerable time.

The most common types of support for houses of this nature are brick piers or blocks.

Before this application was filed, applicant caused a search to be made in the United States Patent and Trademark Office at which time all of the following patents were found.

| Horne | 3,096,065 |
| Taylor | 3,475,008 |
| Deike | 3,750,349 |
| Cook | 3,844,582 |
| Foster | 3,845,597 |

The DEIKE patent discloses blocks placed beneath the frame to support the mobile home. In addition, the DEIKE patent discloses an anchor plate which is stabilized into the perimeter of the mobile home.

FOSTER also discloses anchor plate arrangements for tying down mobile homes.

The other three patents disclose means for blocking up or leveling mobile homes but they do not disclose a tie-down arrangement.

SUMMARY OF THE INVENTION (1) New and Different Function

I have invented a novel way of both blocking up or leveling and supporting a mobile home and simultaneously anchoring the mobile home. There are considerable problems in doing both with a single unit. Mobile homes should be blocked up or supported and leveled from their main beams. I.e. the mobile home is designed for the main beams to be the main support carrying members. However, normally the main beams are spaced well away from the peripheral edges of the mobile home and the tie-downs are meant and desired to be under the peripheral edges. If the tie-down is spaced or forced inwardly from the peripheral edge to any great extent, the tie-down straps tend to bend the lower skirts extending down from the peripheral edge of the mobile home.

With my invention, the support plate and arm may be pivoted up from its attachment to the main frame so that it normally rides with the trailer underneath the skirts along the peripheral edge. However, when in use it is pivoted down and although attached to the main beam, its actual location is closer to the peripheral edge than beneath the main beam. In this way, the same plate can be used as the tie-down plate when it is anchored into the ground as well as be used for the block up or leveling or stabilizing plate.

Particularly, I have found it advantageous to use a gear and worm mechanism to torque the arm downward. When the worm is turned a great deal of torque can be applied to the gear and, thus, to the arm to position it firmly against the ground. However, because of the mechanical advantage between the worm and the gear and because of the angle of the teeth, the worm acts to self lock the arm in place and it is not necessary to lock the arm in place other than with the worm itself.

Thus, it may be seen that the total function of my invention far exceeds the sum of the functions of the individual arms, plates, stake pins, gears, etc.

(2) Objects of this Invention

An object of this invention is to block up or level a mobile home and also to tie-down a mobile home.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 4 is an end sectional view of one unit taken on line 4—4 of FIG. 5, with parts broken away for clarity.

FIG. 5 is a top plan view of one unit.

FIG. 6 is a side sectional view of one unit taken on line 6—6 of FIG. 5.

FIG. 7 is a detail of a second embodiment of the torquing unit according to this invention.

DESCRIPTION OF THE PREFERRED EMBODIMENTS

Figure 1:
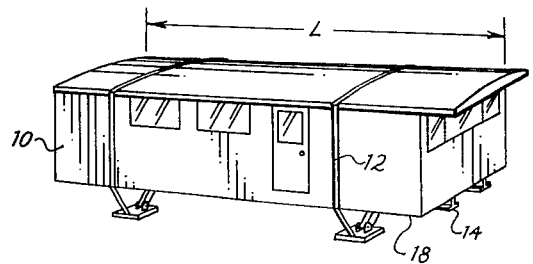
FIG. 1 is a perspective representation, schematic in character, showing my invention with a mobile home.
Figure 2:
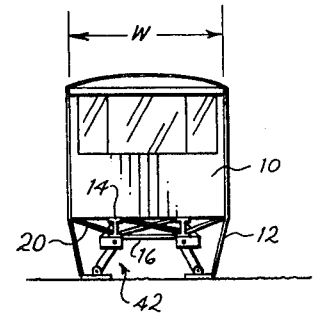
FIG. 2 is an end view of a mobile home showing my invention in use.
Figure 3:
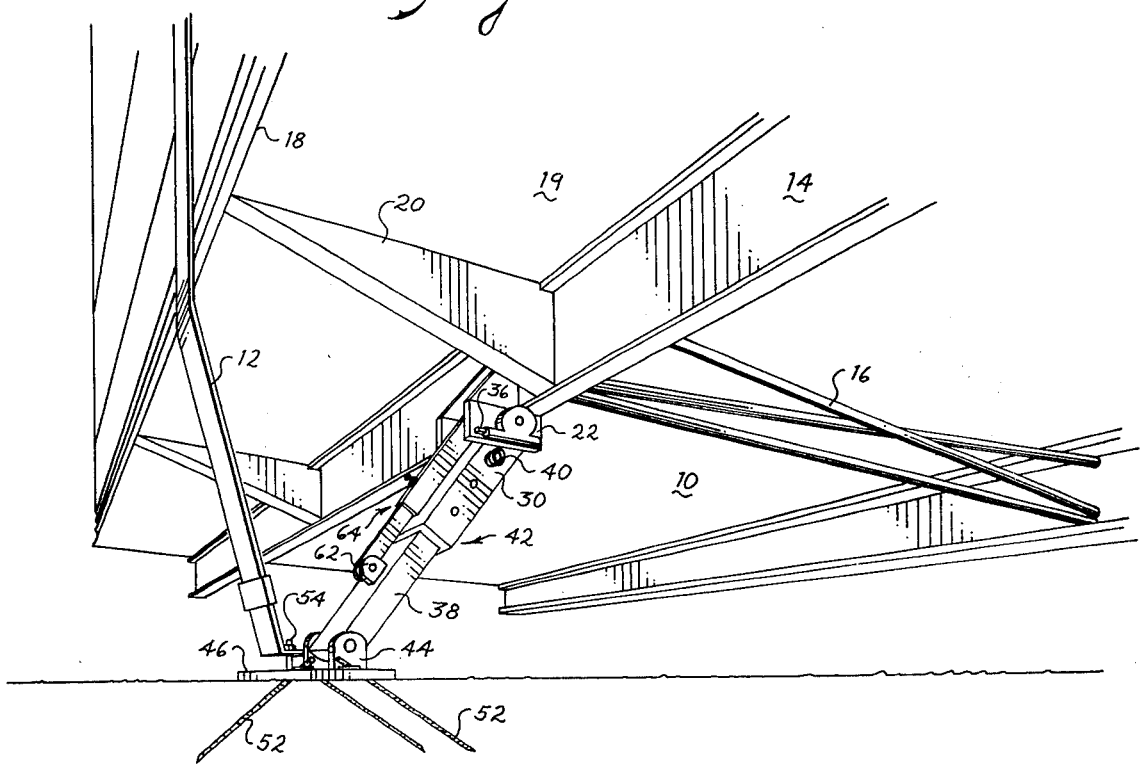
FIG. 3 is a perspective of one unit of my invention in position under a mobile home.

Referring to the drawings, there may be seen in FIGS. 1 and 2 a mobile home 10. The length L of the mobile home 10 is greater than the width W. For clarity of the drawings the wheels of the mobile home have not been shown. Mobile home 10 is shown with straps 12 extending over the top of the mobile home 10 to securely anchor the home to prevent it from being blown over in the event of high winds or the like.

Mobile home 10 will have main longitudinal beams 14 extending lengthwise under floorboards 19 of the mobile home. The beams 14 are braced together by cross beams 16 and the peripheral edge 18 has struts or cantilevered beams 20 extending from the longitudinal beams 14. The struts 20 are sometimes called outrigger beams.

Gear plate 22 is attached, as by welding, to the longitudinal beam 14. In as much as considerable torque as well as support pressure is applied to the gear plate it is desirable to place gusset 24 along one edge of the gear plate and to the webb of the longitudinal beam. Beam ear 26 is attached to the longitudinal beam 14 and spaced from the gear plate 22. Shaft 28 extends through and is journalled to the beam ear 26 and gear plate 22. The axis of the shaft is aligned with the longitudinal beam 14 and, therefore, is located or positioned relative to the length of the trailer, as seen in the drawings.

Top arm 30 in the form of square tubing or tube is welded to the shaft 28 between the gear plate 22 and the beam ear 26. Large gear 32 is attached to the shaft 28 on the opposite side of the gear plate from the beam ear. The large gear is securely attached to the shaft 28 as by a key, which method of attachment is well known in the mechanical arts. Although the large gear 32 could be keyed to the shaft 28, I prefer to use a shear pin through the large gear 32 and the shaft 28. Therefore, excessive torque upon the arm 42 will shear the pin rather than bend longitudinal beams 14 or do other damage. Worm gear 34 is journalled to the gear plate 22 and is operatively connected with the large gear 32. Worm gear 34 has a square pin 36 extending from it. Therefore, it may be seen that a crank can be extended from beyond the outer perimeter of the mobile home and engaged with the square pin 36 to rotate the worm gear 34 inasmuch as the worm gear unit is oriented with the gear extending toward the peripheral edge 18 of the mobile home. The rotation of the worm gear 34 by a crank will rotate the shaft 28 so that the arm 30 welded to the shaft is positioned either in a horizontal position in the vicinity of the bottom of the floorboards 19 of mobile home 10 or it can be rotated downward in a position as seen in the drawings. However, once it is fixed in a position as determined by the worm gear, it will be locked in that position because of the angle of the teeth of the worm gear and because torque from the arm through the large gear 32 will tend to thrust the worm endwise rather than rotate it.

FIG. 7 shows a second embodiment of the gear arrangement. Large gear 132 is attached to the shaft. Small gear or pinion 134 is meshed therewith about a stub shaft. The pinion has connected to it square pin 136 for the engagement of a crank, although in this case it will be understood that the crank itself would be basically aligned with the longitudinal beam 14 of the mobile home rather than at right angles thereto. Two dogs 135 engage the pinion to lock the pinion in place so that it cannot be rotated in either direction.

Analysis by those having ordinary skill in the mechanical arts will show that the pinion and gear may be used to torque the arm 30 to a desired position as was described previously for the worm and gear mechanism.

Bottom arm 38 in the form of square tubing or tube is telescoped within top arm 30. Three holes through the top arm 30 provide three positions for arm pin 40 by which the total length of arm 42 may be adjusted. The bottom of bottom arm 38 extends between plate ears 44 on base plate 46 and pivoted thereto. It will be understood that by the total length of arm 42 it is meant the distance from plate ears 44 to the shaft 28. By the term arm 42 it is meant the combined top arm 30, bottom arm 38 with their arm pin 40 holding in the desired arm length.

Base plate 46 is a rectangular plate having the pin ears 44 located approximately in the center thereof as seen in FIG. 5. On either side of the ears 44 are located elongated slots 50. The slots are located in proximity to and basically aligned with the arm 42, which is to say they are at right angles to base pin 48. The slots are approximately two times as long as they are wide and the width of the slot corresponds roughly to the diameter of the stake. Therefore, stake pin 52 in the form of concrete reinforcing bars can be placed within the elongated slot and can be angled to the extent available by the elongated slot 52 and driven into the ground. Thus, the elongated slot provides a guide for driving the stake pins 52 at the correct angle.

Also there is an elongated slot in the outer edge of the base plate 46, i.e., on the edge the greatest distance from the longitudinal beam 14. The slot would be about in the center, i.e., halfway between the two edges of the base plate, and it is elongated in a direction that forms a right angle with the direction of the arm, 42, i.e., parallel with the base pin 48. Therefore, stake pin 52 may be driven through it at an angle, as clearly seen in FIGS. 5 and 6.

Strap bolt 54 is attached at the very edge of the base plate, and upward from the base plate. Strap clip 56 is attached to the strap bolt 54 by a nut. The strap clip has two elongated strap slots 58 through them. The strap 12 extends down from the peripheral edge 18 of the mobile home through one of the strap slots and back through the other and is held securely in place by clamp 60.

Lug 62 on the bottom arm 38 provides for the emplacement of brace 64 between the arm 42 and the longitudinal beam 14. The arm is shown in FIG. 4 in place. As may be seen, the arm includes brace rod 66 within brace tube 68 held in position by set screw 70.

To use my invention, when the mobile home 10 is positioned in place, the arms 42 are lowered from their travel position, which is in the vicinity of the floorboards 19 of the mobile home, to a position where the base plate firmly contacts the ground. If the base plate is not somewhat near the peripheral edge so that the strap 12 does not exert excessive force against the peripheral edge, it may be adjusted to the proper position by extending the arm 42 by telescoping the bottom arm outward within the top arm 30 and readjusting the arm pin 40. Considerable force can be exerted downward on the arm by using the crank within the gear torquing mechanism. However, if additional force is desired, a jack can be placed beneath the longitudinal beam 14 and the beam 14 raised with the jack and, thus, elevating the mobile home at this point. Alternatively, a hydraulic cylinder may be placed between the lug 62 on the arm and the longitudinal beam 14 and pressure from the hydraulic cylinder can be used to force the base plate downward in addition to the force exerted through the torquing gear works of FIG. 7. After the base plate is securely on the ground the stake pins 52 are driven into place through the slots 50 and 58 as described above.

Then, although it is not necessary but if desired, the brace 64 can be put in place at that time. The nut upon the strap bolt 54 is then tightened to take up any slack and the straps are attached through the strap clip 56 with clamp 60 as tightly as possible. Additional tension can be placed upon the strap by tightening the nut upon the strap bolt 54. As soon as all four base plates have been adjusted, it may be seen that the trailer is supported, level, locked up and tied down.

To move the trailer, the steps are basically repeated in reverse. I.e., the nut on the bolt 54 is loosened, the straps 12 are removed from the clamp 60 and the clip 56 and the stake pins 52 pried loose and removed from the ground and the brace 64 removed that was installed. Thereafter, the crank is engaged into the torque gearing mechanism and the arm rotated upward. If the arm has been extended, the arm pin 40 is removed and the bottom 38 is telescoped within the top arm as far as it can go and the pin 40 placed into it in that position and the arm torqued upward until it is in a position below the floorboards 19. The mobile home is then ready to be moved.

The race 64 can advantageously extend from a lug on the top arm 30 to the top of the web of the longitudinal beam 14.

The straps 12 may be built into the mobile home rather than exterior thereof as shown.

As an aid to correlating the terms of the claims to the exemplary drawing, the following catalog of elements is provided:

| | | | |
|---|---|---|---|
| L | length | W | width |
| 10 | mobile home | 44 | plate ears |
| 12 | straps | 46 | base plate |
| 14 | longitudinal beam | 48 | base pin |
| 16 | cross beams | 50 | slots |
| 18 | peripheral edge | 52 | stake pin |
| 19 | floorboards | 54 | strap bolt |
| 20 | struts | 56 | strap clip |
| 22 | gear plate | 58 | strap slots |
| 24 | gusset | 60 | clamp |
| 26 | beam ear | 62 | lug |
| 28 | shaft | 64 | brace |
| 30 | top arm | 66 | rod |
| 32 | large gear | 68 | tube |
| 34 | worm gear | 70 | set screw |
| 36 | square pin | 132 | large gear |
| 38 | bottom arm | 134 | pinion |
| 40 | arm pin | 135 | dogs |
| 42 | arm | 136 | square pin |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A block and tie-down unit for a mobile home having
 a. length and width,
 b. peripheral edges along its length, said length being more than its width, and
 c. at least two longitudinal beams,
 d. said beams spaced inward from said peripheral edges,
 e. said beams forming a major structural support members for said mobile home;
comprising in combination with the above:
 f. a gear plate attached to one of said beams,
 g. a beam ear attached to said beam spaced from said gear plate,
 h. an arm, one end of said arm between said beam ear and gear plate,
 j. a shaft extending through said beam ear and gear plate,
 k. said arm rigidly attached to said shaft,
 m. a gear on said shaft at said gear plate,
 n. toothed means on the gear plate for rotating said gear,
 o. means for attaching a crank to said toothed means,
 p. a base plate,
 q. said base plate having a pair of plate ears thereon,
 r. the other end of said arm between said plate ears and pivoted thereto,
 s. stake holes through said base plate,
 t. said stake holes adapted to receive stake pins therethrough to anchor said stake plate to the ground, and
 u. a strap clip attached to said base plate,
 v. said strap clip being means for attaching a strap which is adapted to extend over the mobile home.

2. The invention as defined in claim 1 further comprising:
 w. said holes through said base plate being elongated whereby reinforcing bars may be angled therethrough before drive therein as stake pins.

3. The invention as defined in claim 1 further comprising:
 w. a lug on said arm,
 x. a brace extending from said lug to said longitudinal beam whereby the arm is held securely in place.

4. The invention as defined in claim 1 wherein
 w. said toothed means includes a worm gear.

5. The invention as defined in claim 1 wherein
 w. said arm includes a top square tube attached to the shaft and a bottom square tube pivoted to said plate ears,
 x. one of said tubes telescoped within the other,
 y. end means for holding the tubes in a selected position, whereby the distance between the gear bolt and plate ears may be adjusted.

6. The invention as defined in claim 5 wherein
 z. said toothed means includes a worm gear.

7. The invention as defined in claim 6 further comprising:
 aa. a lug on said arm,
 bb. a brace extending from said lug to said longitudinal beam whereby the arm is held securely in place.

8. The invention as defined in claim 7 further comprising:
 cc. said holes through said base plate being elongated whereby reinforcing bars may be angled therethrough before drive therein as stake pins.

* * * * *